United States Patent
Kim et al.

(10) Patent No.: US 9,799,332 B2
(45) Date of Patent: Oct. 24, 2017

(54) APPARATUS AND METHOD FOR PROVIDING A RELIABLE VOICE INTERFACE BETWEEN A SYSTEM AND MULTIPLE USERS

(75) Inventors: Nam-Hoon Kim, Yongin-si (KR); Chi-Youn Park, Suwon-si (KR); Jeong-Mi Cho, Seongnam-si (KR); Jeong-su Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 551 days.

(21) Appl. No.: 13/512,222

(22) PCT Filed: Nov. 9, 2010

(86) PCT No.: PCT/KR2010/007859
§ 371 (c)(1),
(2), (4) Date: May 25, 2012

(87) PCT Pub. No.: WO2011/065686
PCT Pub. Date: Jun. 3, 2011

(65) Prior Publication Data
US 2012/0278066 A1    Nov. 1, 2012

(30) Foreign Application Priority Data
Nov. 27, 2009    (KR) .................. 10-2009-0115914

(51) Int. Cl.
*G10L 15/22* (2006.01)
*G10L 17/10* (2013.01)

(52) U.S. Cl.
CPC .............. *G10L 15/22* (2013.01); *G10L 17/10* (2013.01); *G10L 2015/223* (2013.01); *G10L 2015/227* (2013.01)

(58) Field of Classification Search
CPC ......... G10L 17/00; G10L 17/04; G10L 17/10; G10L 17/06; G10L 17/08; G10L 17/05;
(Continued)

(56) References Cited

U.S. PATENT DOCUMENTS 5,884,257 A * 3/1999 Maekawa et al. ............ 704/248
6,111,580 A * 8/2000 Kazama et al. .............. 715/863
(Continued)

FOREIGN PATENT DOCUMENTS

CN    1524210 A    8/2004
EP    0582989 A2   2/1994
(Continued)

OTHER PUBLICATIONS

International Search Report (PCT/ISA/210) dated Aug. 2, 2011, issued in International Application No. PCT/KR2010/007859.
(Continued)

*Primary Examiner* — Abdelali Serrou
(74) *Attorney, Agent, or Firm* — Sughrue Mion, PLLC

(57) ABSTRACT

A communication interface apparatus for a system and a plurality of users is provided. The communication interface apparatus for the system and the plurality of users includes a first process unit configured to receive voice information and face information from at least one user, and determine whether the received voice information is voice information of at least one registered user based on user models corresponding to the respective received voice information and face information; a second process unit configured to receive the face information, and determine whether the at least one user's attention is on the system based on the received face information; and a third process unit configured to receive the voice information, analyze the received voice information, and determine whether the received voice information
(Continued)

is substantially meaningful to the system based on a dialog model that represents conversation flow on a situation basis.

9 Claims, 7 Drawing Sheets

(58) Field of Classification Search
CPC ......... G10L 17/22; G10L 17/12; G10L 17/24; G10L 15/26; G10L 25/78; G10L 15/083; G10L 15/197; G10L 15/25; G10L 13/027; G10L 15/22; G10L 15/24; G10L 17/02; G10L 2015/088; G10L 25/63; G06F 3/011; G06F 17/274; G06F 17/3003
USPC ....... 704/246, 248, 233, 275, 270, 259, 277, 704/E17.001–E17.003, E15.007
See application file for complete search history.

(56) References Cited

U.S. PATENT DOCUMENTS

| | | | |
|---|---|---|---|
| 7,301,526 B2* | 11/2007 | Marvit et al. | 345/156 |
| 7,343,289 B2* | 3/2008 | Cutler et al. | 704/259 |
| 7,701,437 B2 | 4/2010 | Thursfield | |
| 7,734,468 B2 | 6/2010 | Park et al. | |
| 9,442,621 B2* | 9/2016 | Hauser | G06F 3/03543 |
| 2002/0181773 A1* | 12/2002 | Higaki | G06K 9/00335 |
| | | | 382/190 |
| 2004/0006483 A1 | 1/2004 | Sasaki et al. | |
| 2004/0175020 A1* | 9/2004 | Bradski | G06F 1/3203 |
| | | | 382/103 |
| 2005/0004496 A1* | 1/2005 | Pilu | H04N 5/232 |
| | | | 600/595 |
| 2005/0021340 A1* | 1/2005 | Steinbiss | 704/273 |
| 2005/0207622 A1 | 9/2005 | Haupt et al. | |
| 2005/0225723 A1* | 10/2005 | Pilu | 351/209 |
| 2005/0238209 A1* | 10/2005 | Ikeda | G06K 9/00248 |
| | | | 382/118 |
| 2007/0074114 A1* | 3/2007 | Adjali et al. | 715/706 |
| 2007/0136071 A1* | 6/2007 | Lee | G10L 15/25 |
| | | | 704/270 |
| 2007/0199108 A1* | 8/2007 | Angle et al. | 901/17 |
| 2007/0247524 A1* | 10/2007 | Yoshinaga | G06K 9/0061 |
| | | | 348/78 |
| 2008/0147488 A1* | 6/2008 | Tunick | G06Q 30/02 |
| | | | 705/7.29 |
| 2008/0189112 A1* | 8/2008 | Cohen et al. | 704/260 |
| 2009/0210227 A1 | 8/2009 | Sugiyama et al. | |
| 2009/0273687 A1* | 11/2009 | Tsukizawa et al. | 348/222.1 |
| 2010/0036792 A1* | 2/2010 | Sawada et al. | 706/52 |
| 2010/0125816 A1* | 5/2010 | Bezos | 715/863 |
| 2010/0287013 A1* | 11/2010 | Hauser | G06F 3/03543 |
| | | | 705/7.37 |
| 2011/0006978 A1* | 1/2011 | Yuan | G06F 3/013 |
| | | | 345/156 |
| 2011/0035221 A1* | 2/2011 | Zhang | G10L 17/00 |
| | | | 704/246 |
| 2011/0096941 A1* | 4/2011 | Marzetta | G06F 3/013 |
| | | | 381/92 |

FOREIGN PATENT DOCUMENTS

| | | |
|---|---|---|
| JP | 9-218770 A | 8/1997 |
| KR | 10-2003-0036745 A | 5/2003 |
| KR | 10-0580619 B1 | 5/2006 |
| KR | 10-2008-0075932 A | 8/2008 |
| WO | 02/37474 A1 | 5/2002 |
| WO | 02/063599 A1 | 8/2002 |

OTHER PUBLICATIONS

Beyond3D, "Speech recognition middleware VoiceIn now available to Wii developers", Jun. 26, 2007, 2 pages total.

Terdiman, Daniel, "Microsoft's Project Natal: What does it mean for game industry?", CNET News, Jun. 1, 2009, 6 pages total.

Communication from the State Intellectual Property Office of P.R. China dated Feb. 25, 2015 in a counterpart application No. 201080053726.1.

Communication dated Aug. 28, 2014 issued by the State Intellectual Property Office of People's Republic of China in counterpart Chinese Application No. 201080053726.1.

Communication dated Nov. 11, 2014 issued by European Patent Office in counterpart European Application No. 10833498.8.

Communication dated Sep. 8, 2015, issued by Korean Intellectual Property Office in counterpart Korean Patent Application No. 10-2009-0115914.

* cited by examiner

A1: "COULD YOU GIVE ME SOMETHING TO DRINK?"

B1: "YES"
B2: "NO"

C1: "WATER, PLEASE"
C2: "MILK, PLEASE"
C3: "JUICE, PLEASE"

APPARATUS AND METHOD FOR PROVIDING A RELIABLE VOICE INTERFACE BETWEEN A SYSTEM AND MULTIPLE USERS

CROSS REFERENCE TO RELATED APPLICATIONS

This application is a National Stage of International Application No. PCT/KR2010/007859 filed Nov. 9, 2010, claiming priority based on Korean Patent Application No. 10-2009-0115914 filed Nov. 27, 2009, the contents of all of which are incorporated herein by reference in their entirety.

1. Technical Field

Embodiments relate to a voice interface between a system and a user.

2. Background of the Related Art

As performances of devices increase in a home environment and services related to the devices become common, a diversity of user interfaces have been introduced.

A related art user interface is a user interface utilizing voice recognition. Improvement of a voice activity detection (VAD) capability, which detects a user's voice section from an input signal, is essential to implementing a voice recognition-based user interface.

In particular, for a voice interface in a home environment, interaction between several users and a system is expected. Therefore, it is important to determine whether speech of a user detected from an input signal is a voice for directing a specific task to the system, or speech from communication with another user. However, the related art VAD assumes that inputs come from only a single speaker. Therefore, the related art VAD only discerns speech from noise. Thus, the related art VAD system has a limitation for a voice interface between multiple users.

SUMMARY

Embodiments may provide a communication interface apparatus for a system and a plurality of users, including: a first process unit configured to receive voice information and face information from at least one user, and determine whether the received voice information is voice information of at least one registered user based on user models corresponding to the respective received voice information and face information; a second process unit configured to receive the face information, and determine whether the at least one user's attention is on the system based on the received face information; and a third process unit configured to receive the voice information, analyze the received voice information, and determine whether the received voice information is substantially meaningful to the system based on a dialog model that represents conversation flow on a situation basis.

In an aspect of an exemplary embodiment, there is provided a communication interface apparatus for a system and a plurality of users, including: a first process unit configured to receive voice information and face information from at least one user, and determine whether the received voice information is voice information of at least one registered user based on user models corresponding to the respective received voice information and face information; a second process unit configured to receive the face information, and determine whether the at least one user's attention is on the system based on the received face information; and a third process unit configured to receive the voice information, analyze the received voice information, and determine whether the received voice information is substantially meaningful to the system based on a dialog model that represents conversation flow on a situation basis.

The first process unit may be further configured to calculate a first probability that the at least user is the at least one registered user by comparing the received voice information with the user models, calculate a second probability that the at least one user is the at least one registered user by comparing the received face information with the user models, and determine whether the received voice information is voice information of the at least one registered user based on the calculated first and second probabilities.

The second process unit may be further configured to extract directional information of a direction of the at least one user's eyes or the at least one user's face from the face information, and determine whether attention is on the system based on the extracted directional information of a direction of the eyes or face.

The third process unit may be further configured to determine that the received voice information is substantially meaningful to the system when meanings of the received voice information corresponds to the communication tree.

In an aspect of an exemplary embodiment, there is provided a communication interface method for a system and a plurality of users, including: receiving pieces of voice information and face information from at least one user, and determining whether the received voice information is voice information of a registered user based on user models corresponding to the respective received voice information and face information; determining whether the at least one user's attention is on the system based on the received face information; and analyzing a meaning of the received voice information, and determining whether the received voice information is substantially meaningful to the system based on a dialog model that represents conversation flow on a situation basis.

In a further aspect of an exemplary embodiment, there is provided a method of determining whether voice information is meaningful to a system, including: performing semantic analysis on the voice information; determining whether at least one user's attention is on the system based on the face information; determining whether the semantic analysis corresponds to a conversation pattern; and transmitting the voice information to the system when the semantic analysis corresponds to the conversation pattern.

DESCRIPTION OF DRAWINGS

The accompanying drawings, which are included to provide a further understanding of embodiments and are incorporated in and constitute a part of this specification, illustrate exemplary embodiments, and together with the description serve to explain the principles of embodiments.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
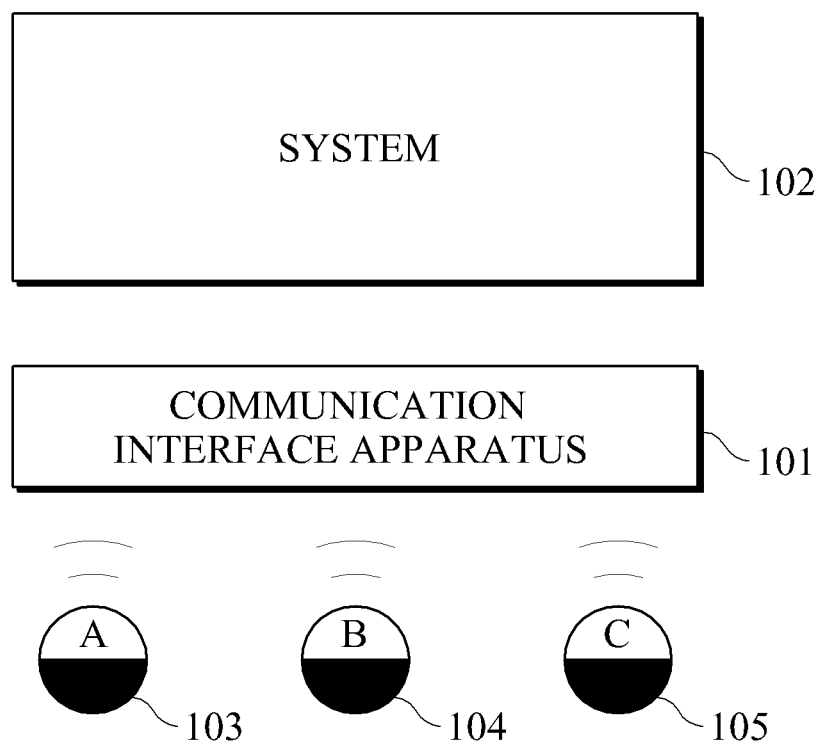
FIG. 1 is a diagram illustrating an example of a communication interface apparatus.

FIG. 1 illustrates a diagram of an example of a communication interface apparatus. Referring to FIG. 1, the communication interface apparatus 101 may provide a user interface between a system 102 and a plurality of users 103, 104, and 105. For example, the communication interface apparatus 101 may receive system control instructions from the users 103, 104, and 105, analyze the received control instructions, and transmit the analyzed control instructions to the system 102. The communication interface apparatus 101 may be connected in a wired or wireless manner to the system 102, and may be provided inside the system 102.

The system 102 may be a device that carries out a particular task according to the instructions from the users 103, 104, and 105. For example, the system 102 may be an electronic appliance, a console game device, or an intelligent robot which interacts with the multiple users 103, 104, and 105.

The communication interface apparatus 101 may detect a voice of a user who has been previously registered, from among voices of the multiple users 103, 104, and 105. For example, if it is assumed that only a user A 103 and a user B 104 are registered, when all multiple users 103, 104, and 105 speak, the communication interface apparatus 101 may detect voices of only the previously registered user A 103 and the user B 104.

In addition, the communication interface apparatus 101 may transmit a meaningful voice from the detected voices to the system 102. For example, if a voice of the user A 103 directs a particular task to the system 102 and a voice of the user B 104 greets the user C 105, the communication interface apparatus 101 may analyze a meaning of the detected voice and transmit the voice of the user A 103 to the system 102 according to the analyzed result.

Therefore, when the multiple users 103, 104, and 105 interact with the system 102, it is possible to allow the system 102 to react only to a meaningful instruction of the registered user.

Figure 2:
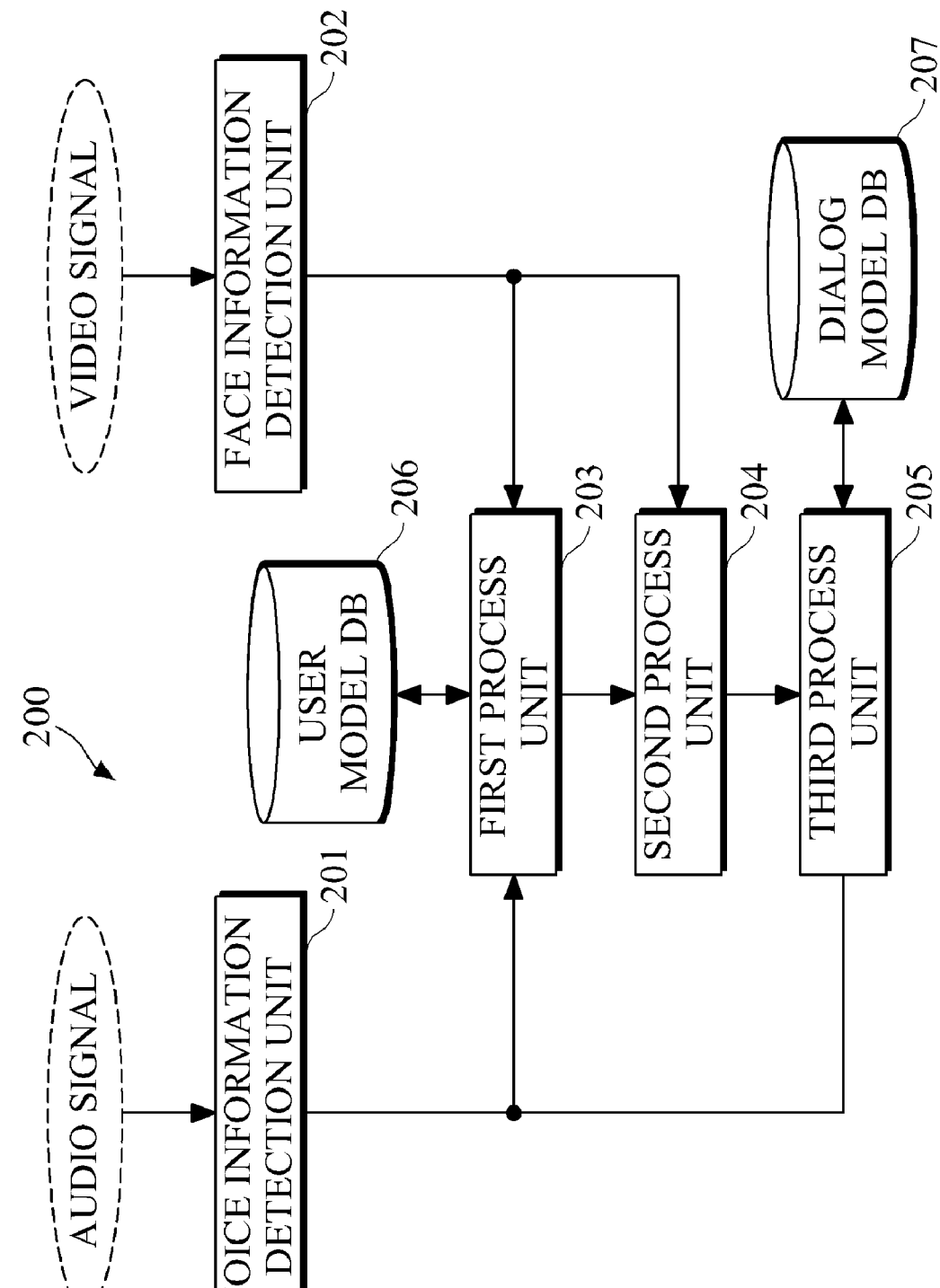
FIG. 2 is a diagram illustrating an example of the communication interface apparatus in detail.

FIG. 2 illustrates a detailed example of the communication interface apparatus. Referring to FIG. 2, the communication interface apparatus 200 may include a voice information detection unit 201, a face information detection unit 202, a first process unit 203, a second process unit 204, a third process unit 205, a user model database (DB) 206, and a dialog model DB 207.

The voice information detection unit 201 receives an audio signal and detects voice information from the received audio signal. The audio signal may include a voice signal and a non-voice signal. The voice signal is generated by the user's speech, and the non-voice signal is generated by gestures of the user or sound around the user. For example, the voice information detection unit 201 may extract feature information such as smooth power spectrum, Mel frequency cepstral coefficients (MFCCs), perceptual linear predictive coefficients (PLPs), etc. from the received audio signal.

The face information detection unit 202 receives a video signal and detects face information from the received video signal. The face information may be a specific region of an image corresponding to a human face in a video image. For example, the face information detection unit 202 may use a face detection scheme such as Ada-boost to extract face information corresponding to a face region of a user from the received video signal.

The first process unit 203 receives the voice information detected by the voice information detection unit 201, and the face information detected by the face information detection unit 202. In addition, the first process unit 203 determines whether the received voice information is voice information of a registered user.

Determination of the received voice information may be performed based on user models stored in the user model DB 206. The user model may be defined as voice information and face information of registered users. For example, the user model DB 206 may store voice information and face information on a user. The first process unit 203 may compare received voice information/face information to the user model stored in the user model DB 206, and determine whether the received voice information is voice information of a registered user. For example, the first process unit 203 may calculate the probability of the received voice information being identical with the user model and the probability of the received face information being identical with the user model, and then determine whether the received voice information is voice information of the registered user using the calculated probability values.

When it is determined that the received voice information is voice information of the registered user, the second process unit 204 receives face information from the face information detection unit, and determines whether the user's attention is on the system, based on the received face information. Here, the user's attention on the system refers to an event in which the user has an intention to direct an instruction or a specific task to the system. For example, when compared to an event where a user speaks while looking at the system and an event where a user speaks without looking at the system, it may be determined that the attention is on the system when the user speaks while looking at the system.

The determination of the occurrence of the attention may be performed based on the directions of the user's eyes and face, included in the received face information. For example, the second process unit 204 may extract information of the directions of the user's eyes and face from the received face information, and determine whether the user is facing the system based on the extracted information of the directions of the eyes and face.

If there is attention on the system, the third process unit 205 receives the voice information from the voice information detection unit 201, analyzes a meaning of the received voice information, and determines whether or not the analyzed meaning is substantially meaningful to the system. Here, a state of being substantially meaningful to the system indicates that the speech of the user does not move away from a general or fixed conversation pattern (or discourse context). For example, if a user says "start cleaning", and a cleaning robot begins cleaning, the user's utterances "stop cleaning" and "mop the living room more" corresponds to the general conversation pattern of the cleaning robot. However, utterances such as "it is fine today" and "cook something delicious" deviate from the general conversation pattern.

Determination of whether the received voice information is substantially meaningful to the system may be performed based on the dialog models stored in the dialog model DB 207. Here, the dialog model may be defined as the conversation pattern described above. For example, a dialog model may be in the form of a communication tree consisting of nodes and arcs, wherein the nodes correspond to the meanings of the utterances and the arcs correspond to the order of conversation. The third process unit 205 analyzes the received voice information on a meaning level, and converts the analyzed information into text. Then, the third process unit 205 may compare the converted text to the communication tree, and if the converted text corresponds to a particular node, determine that the received voice information is substantially meaningful to the system.

Figure 3:
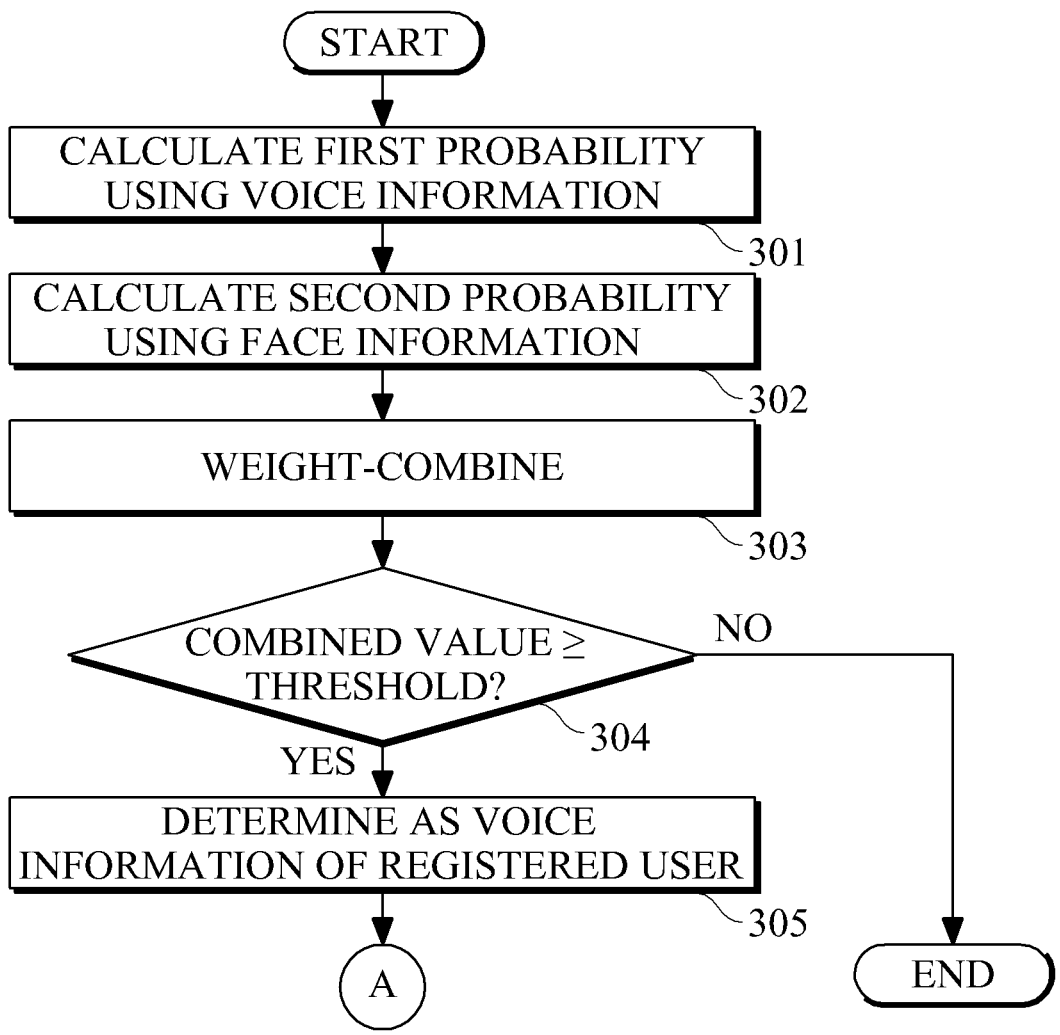
FIG. 3 is a flowchart illustrating an example of operation procedures of the first process unit of FIG. 2.

FIG. 3 illustrates a flowchart of an example of operation procedures of the first process unit of FIG. 2. With reference to FIG. 3, a method of determining whether received voice information is voice information of a registered user will be described below.

In FIG. 3, the first process unit 203 compares the received voice information with a user model to calculate a first probability (301). For example, the first probability P1 may be a maximum value of probabilities that voice feature information corresponding to a voice section is identical with a voice feature model of a registered user which is configured offline, and may be represented by equation 1 as below.

$$P_1 = P(S|\hat{\theta}p)$$

where, $\hat{\theta}p = \text{argmax} P(S|\theta p), \{\theta 1, \theta 2, \ldots, \theta p\}$ (1)

Here, θ denotes a voice feature model of a registered user, p denotes the number of registered users, and S denotes received voice information.

Then, a second probability $P_2$ is calculated by comparing received face information and a user model (302). For example, the second probability P2 may be a maximum value of probabilities that image feature information corresponding to a face region is identical with a face feature model of a registered user, which is configured offline, and may be represented by equation 2 as below.

$$P_2 = P(V|\hat{\Psi}p),$$

where, $\hat{\Psi}p = \text{argmax} P(S|\Psi p), \{105\ 1, \Psi 2, \ldots, \Psi p\}$ (2)

Here, ψ denotes a face feature model of a registered user, p denotes the number of registered users, and V denotes received face information.

Then, the first probability $P_1$ and the second probability $P_2$ are combined using a weight (303).

$$P = f(P_1, P_2) \quad (3)$$

$$= \begin{cases} \frac{1}{N}(\alpha P_1 + (1-\alpha)P_2) & P_{speech} = P_{face} \\ 0 & P_{speech} \neq P_{face} \end{cases}$$

In Equation 3, α denotes a weight, which may vary according to illuminance and a signal-to-noise ratio. In addition, a registered user selected based on a voice feature model is denoted as $P_{speech}$ and a registered user selected based on a face feature model is denoted as $P_{face}$. If $P_{speech}$ and $P_{face}$ are the same as each other, a normalized probability value is assigned. Otherwise, 0 may be assigned.

Then, a combined value P is compared with a threshold (304), and if the combined value P is greater than the threshold, it is determined that the received voice information is voice information of a registered user (305), and otherwise the procedure is terminated.

Figure 4:
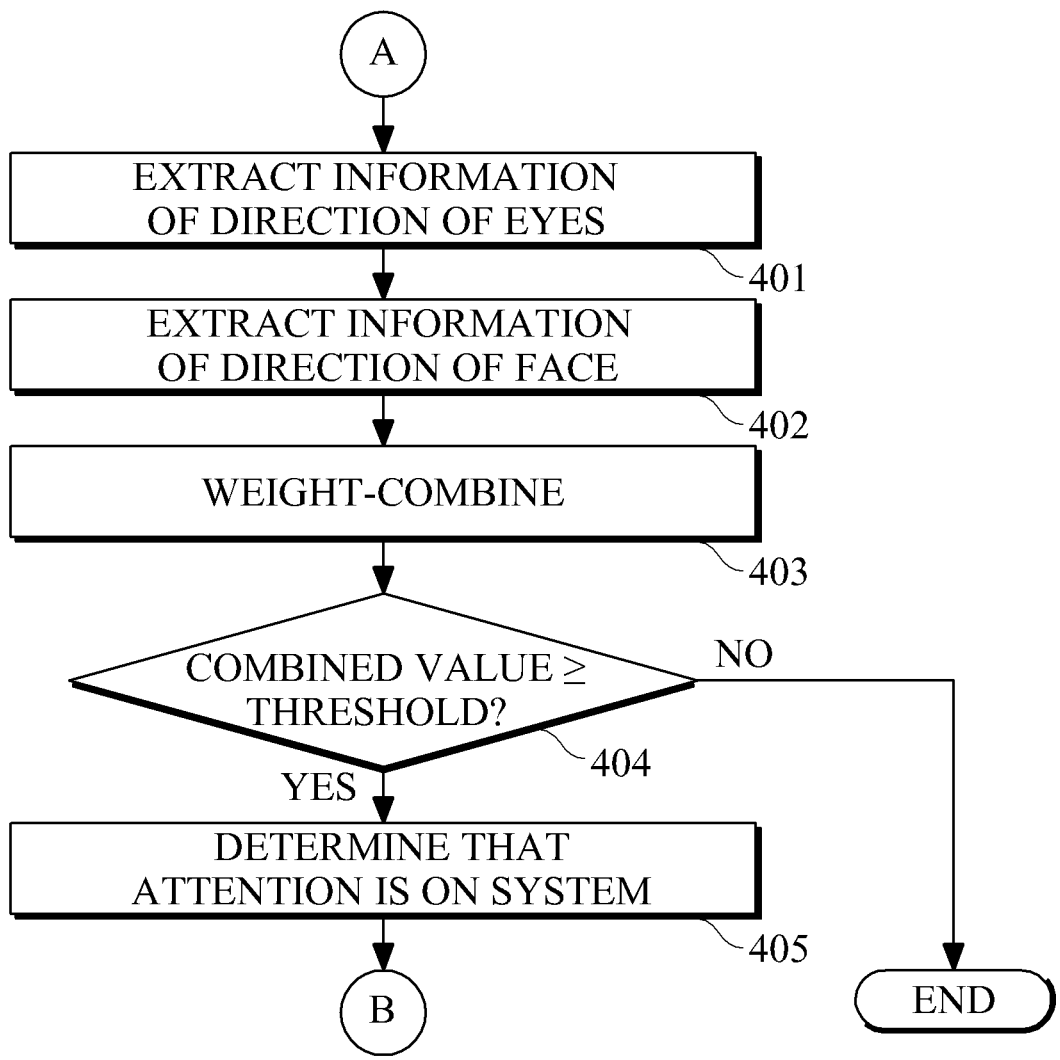
FIG. 4 is a flowchart illustrating an example of operation procedures of the second process unit of FIG. 2.

FIG. 4 illustrates a flowchart of an example of operation procedures of the second process unit 204 of FIG. 2. With reference to FIG. 4, a method of determining whether a user's attention is on a system will be described below.

In FIG. 4, the second process unit 204 extracts information of a direction of eyes from face information (401). Also, the second process unit 204 extracts information of a direction of a face from face information (402). Thereafter, the second process unit 204 combines the extracted information of the direction of the eyes and information of the direction of the face by applying a weight (403). Then, the combined value is compared with a threshold (404), and if the combined value is greater than the threshold, it is determined that the user's attention is on the system (405). Otherwise, the procedure is terminated. The above procedure is represented by Equation 4 as below.

$$f(P(O_{eye}|\Psi_p), P(O_{face}|\Psi_p)) = \beta P(O_{eye}|\Psi_p) + (1-\beta)P(O_{face}|\Psi_p)$$

$$f(P(O_{eye}|\Psi_p), P(O_{face}|\Psi_p)) \geq \tau_{orientation}$$

where $0 \leq \beta \leq 1$, $0 \leq \tau_{orientation} \leq 1$ (4)

Here, $P(O_{eye}|\psi_p)$ denotes a normalized probability value of information of the direction of the eyes, $P(O_{face}|\psi_p)$ denotes a normalized probability value of information of the direction of the face, and β denotes a weight.

Figure 5:
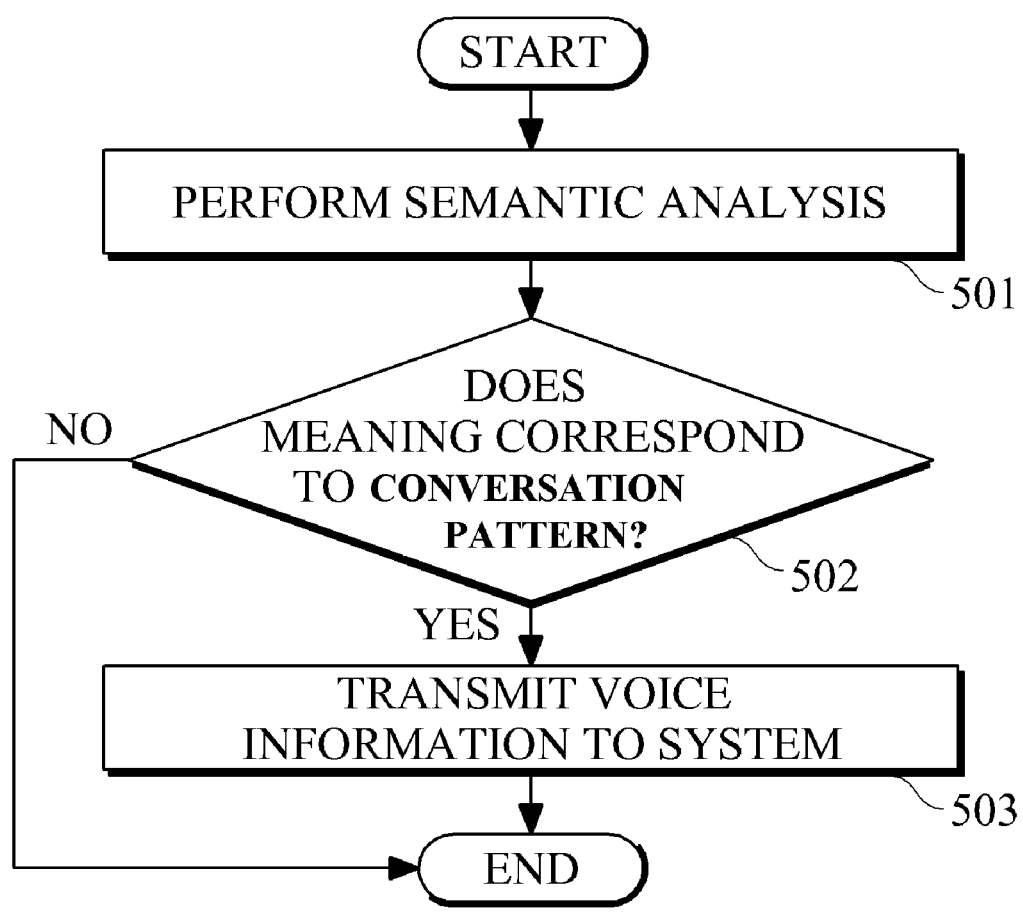
FIG. 5 is a flowchart illustrating an example of operation procedures of the third process unit of FIG. 2.

FIG. 5 illustrates a flowchart of an example of operation procedures of the third process unit 205 of FIG. 2. With reference to FIG. 3, a method of determining whether voice information is meaningful to the system will be described below.

Figure 6:
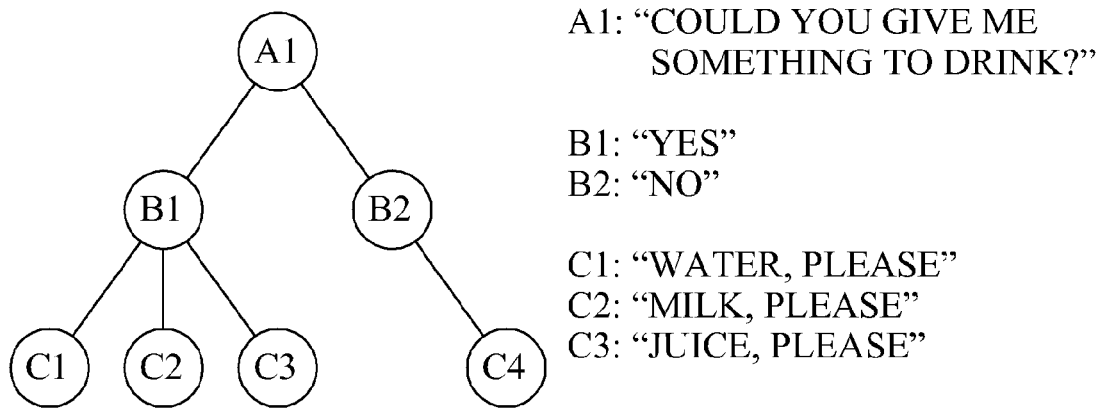
FIG. 6 is a diagram illustrating an example of a dialog model.

In FIG. 3, the third process unit 205 analyzes the meaning of the received voice information (501). For example, the third process unit 205 may recognize the received voice information, and convert the received voice information into text. Additionally, the third process unit 205 determines whether the analyzed meaning corresponds with the conversation pattern (502). For example, the third process unit 205 may determine whether the meaning analyzed by use of a dialog model as shown in FIG. 6 is meaningful to the system. If the determination result shows that the meaning corresponds to the conversation pattern, the voice information is transmitted to the system, or a control instruction corresponding to the voice information is generated and transmitted to the system (503). Otherwise, the procedure is terminated.

FIG. 6 illustrates a diagram of an example of a dialog model. In FIG. 6, nodes of a tree correspond to the meanings of conversations, and arcs of the tree correspond to the order of conversation. For example, a node A1 indicating "could you give me something to drink?" may have two child nodes B1 ("Yes") and B2 ("No") according to the conversation pattern (or context). If the node Al branches to the node B1, the next available nodes may be a node C1 indicating "water, please", a node C2 indicating "milk, please", a node C3 indicating "juice, please", etc., according to the kind of beverage.

The above dialog model may be stored in the dialog model DB 207 on a situation basis. The third process unit 205 receives and analyzes voice information. If the analysis result indicates that the voice information has a meaning of "water, please" at node B1, the voice information is determined to correspond to the conversation pattern. Thus, the voice information is determined to be meaningful to the system. However, if the current dialog state is the node B2, the voice information indicating the meaning of "water, please" is determined as meaningless to the system.

Figure 7:
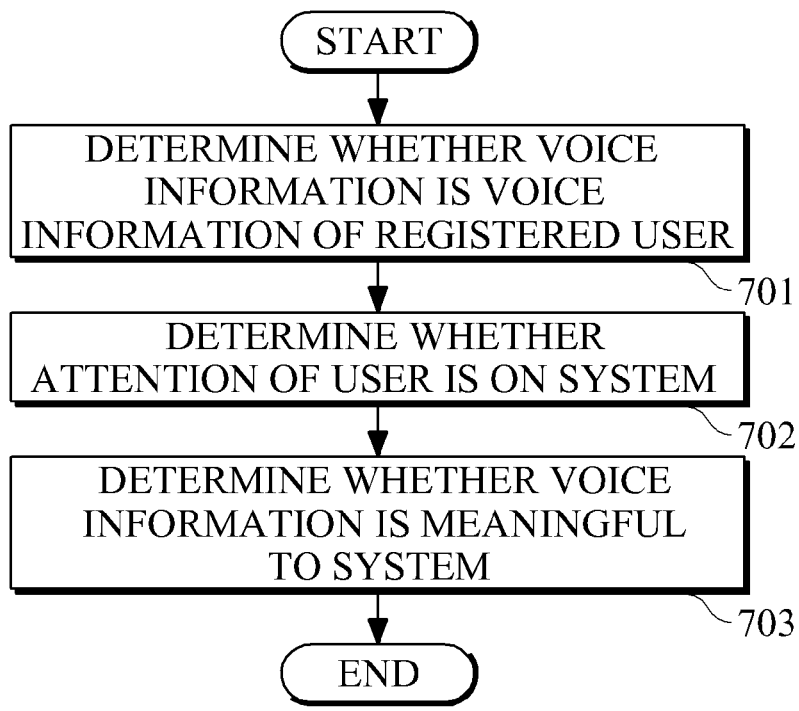
FIG. 7 is a flowchart illustrating an example of a communication interface method.

FIG. 7 illustrates a flowchart of an example of a communication interface method. In FIG. 7, pieces of voice information and face information are received from one or more users, and it is determined whether the received voice information is voice information of a registered user based on user models corresponding to the received voice information and face information (701). For example, the first process unit 203 (see FIG. 2) may selectively detect user information of the user using the method illustrated in FIG. 3, and equations 1 to 3.

If the received voice information is voice information of the registered user, it is determined whether the user's attention is on the system based on the received face information (702). For example, the second process unit 204 (see FIG. 2) may determine the occurrence of the attention based on the method illustrated in FIG. 4 and equation 4.

If the user is paying attention to the system, the meaning of the received voice information is analyzed and it is determined whether the analyzed meaning of the received voice information is meaningful to the system based on the dialog model that represents conversation flow on a situation basis (703). For example, the third process unit 205 may perform semantic analysis and determination of correspondence with the conversation pattern using the methods illustrated in FIGS. 5 and 6.

Figure 8:
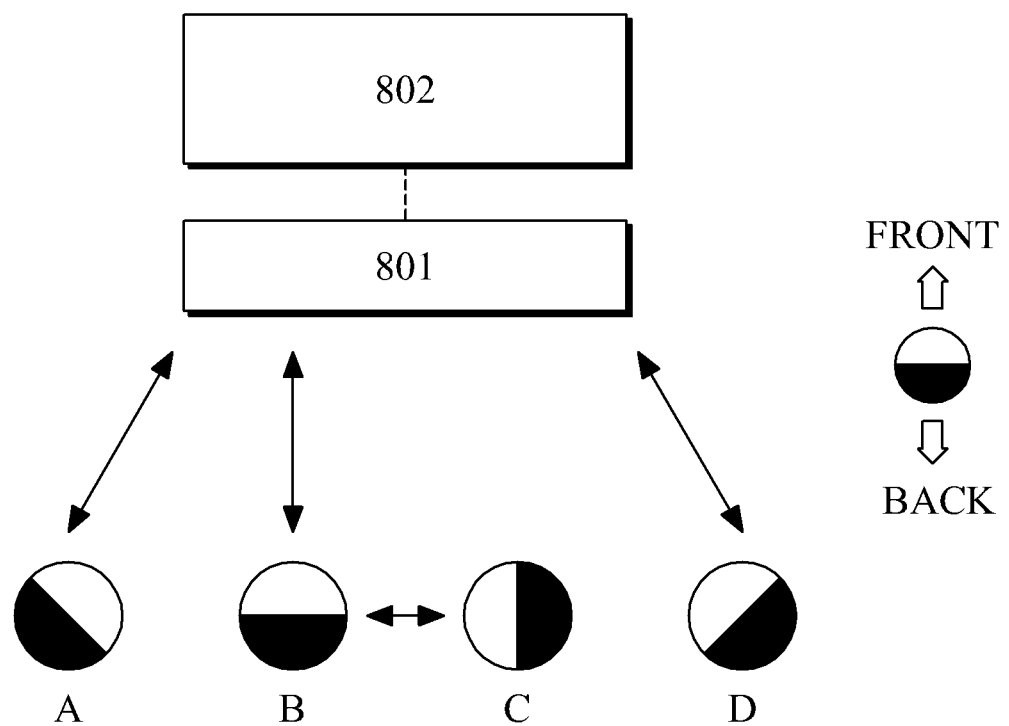
FIG. 8 is a diagram illustrating an example of how to use a communication interface apparatus.

FIG. 8 illustrates a diagram of an example of how to use a communication interface apparatus. For convenience of explanation, the example illustrated in FIG. 8 assumes that there are four users A, B, C, and D. The users A, B, and C are registered. The user A is saying, "order a red t-shirt" facing the communication interface apparatus 801, the user B is saying "the room is dirty, clean the room" facing the communication interface apparatus 801, and the user C is saying, "let's have a break" looking at the user B.

The communication interface apparatus 801 ignores utterances of the user D, who is not registered. In addition, the user interface apparatus 801 also ignores the utterance of the user C, since the user C is not paying attention to the system 802. The user interface apparatus 801 analyzes the meaning of voice information of the user A and the user B. If ordering of an object is required according the conversation flow, only the order instruction of the user A is transmitted to the system 802. The utterance of the user B is ignored, since it is meaningless to system 802.

The communication interface apparatus 801 transmits a control instruction of a user to the system 802 only when a registered user makes a meaningful or significant utterance while paying attention to the system. Therefore, when a plurality of users and the system are interfacing with each other, more accurate and reliable interfacing can be realized.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave, i.e., an internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A communication interface apparatus which communicates with a voice interactive system, comprising:
a first process unit configured to receive voice information and face information about a user, that provides a voice instruction to the voice interactive system, and determine whether the received voice information belongs to a registered user by comparing the received voice information with a user model to calculate a first probability, comparing the received face information with the user model to calculate a second probability, combining the first and second probabilities, and comparing the combined first and second probabilities to a first predetermined threshold;
a second process unit configured to, in response to determining that the received voice information belongs to the registered user, receive the face information, and determine whether an attention of the user is on the voice interactive system based on the received face information, wherein the attention of the user is determined by extracting, from the received face information, first information of a direction of eyes of the user and second information of a direction of a face of the user, combining the first information and the second information based on a weighted factor, and comparing the combined first and second information with a second predetermined threshold;
a third process unit configured to, in response to determining that the attention of the user is on the voice interactive system, receive the voice information, analyze a meaning of the received voice information, and determine a consistency of the received voice information based on the analyzed meaning and a dialog model that represents conversation flow on a basis of a situation, and
a transmitter unit configured to transmit the voice information to the voice interactive system to perform a specific task according to the voice information, in response to determining that the received voice information belongs to the registered user, the attention of the user is on the voice interactive system, and the consistency of the received voice information is held.

2. The communication interface apparatus of claim 1, wherein the user model is defined by portions of voice information and face information of registered users.

3. The communication interface apparatus of claim 1, wherein the dialog model is in the form of a communication tree consisting of nodes and arcs, and wherein the nodes correspond to meanings of utterances and the arcs correspond to an order of conversation.

4. The communication interface apparatus of claim 3, wherein the third process unit is further configured to determine the consistency of the received voice information in response to the meaning of the received voice information corresponding to the communication tree.

5. A communication interface method of a communication interface apparatus which communicates with a voice interactive system, comprising:
receiving portions of voice information and face information about a user, that provides a voice instruction to the voice interactive system, and determining whether the received voice information belongs to a registered user by comparing the received voice information with a user model to calculate a first probability, comparing the received face information with the user model to calculate a second probability, combining the first and second probabilities, and comparing the combined first and second probabilities to a first predetermined threshold;
determining, in response to determining that the received voice information belongs to the registered user, whether an attention of the user is on the voice interactive system based on the received face information, wherein the attention of the user is determined by extracting, from the received face information, first information of a direction of eyes of the user and second information of a direction of a face of the user, combining the first information and the second information based on a weighted factor, and comparing the combined first and second information with a second predetermined threshold;
analyzing, in response to determining that the attention of the user is on the voice interactive system, a meaning of the received voice information, and determining a consistency of the received voice information based on the analyzed meaning and a dialog model that represents conversation flow on a basis of a situation, and
transmitting the voice information to the voice interactive system to perform a specific task according to the voice information, in response to determining that the received voice information belongs to the registered user, the attention of the user is on the voice interactive system, and the consistency of the received voice information is held.

6. The communication interface method of claim 5, wherein the dialog model is in the form of a communication tree consisting of nodes and arcs, and wherein the nodes correspond to meanings of utterances and the arcs correspond to an order of conversation, and the determining the consistency of the received voice information comprises applying the meaning of the received voice information to the communication tree and determining the consistency of the received voice information in response to the meaning of the received voice information corresponding to the communication tree.

7. A method of communicating with a voice interactive system in a communication interface apparatus, comprising:
determining whether the voice information of a user, that provides a voice instruction to the voice interactive system, belongs to a registered user by comparing the voice information with a user model to calculate a first probability, comparing the face information with the user model to calculate a second probability, combining the first and second probabilities, and comparing the combined first and second probabilities to a first predetermined threshold;
determining, in response to determining that the voice information belongs to the registered user, whether an attention of the user is on the voice interactive system based on the face information, wherein the attention of the user is determined by extracting, from the face information, first information of a direction of eyes of the user and second information of a direction of a face of the user, combining the first information and the second information based on a weighted factor, and comparing the combined first and second information with a second predetermined threshold;
in response to determining that the attention of the user is on the voice interactive system, analyzing a meaning of the voice information and determining a consistency of the voice information based on the analyzed meaning and a dialog model that represents conversation flow on a basis of a situation; and
transmitting the voice information to the voice interactive system to perform a specific task according to the voice information, in response to determining that the voice information belongs to the registered user, the attention of the user is on the voice interactive system, and the consistency of the received voice information is held.

8. The method of claim 7, wherein the analyzing the meaning of the voice information comprises recognizing the voice information, and converting the voice information into text.

9. The method of claim 7, further comprising:
transmitting the voice information to the voice interactive system in response to a control instruction, corresponding to the voice information, being generated and transmitted to the voice interactive system.

* * * * *